Oct. 14, 1924.  
B. MARKOW  
CAGE STRUCTURE  
Filed May. 6, 1924

1,511,815

INVENTOR  
Bernard Markow  
BY  
Harry Jacobson  
ATTORNEY

Patented Oct. 14, 1924.

1,511,815

UNITED STATES PATENT OFFICE.

BERNARD MARKOW, OF NEW YORK, N. Y.

CAGE STRUCTURE.

Application filed May 6, 1924. Serial No. 711,321.

*To all whom it may concern:*

Be it known that I, BERNARD MARKOW, a citizen of the United States, residing at the city of New York, borough of Manhattan, in the county of New York and State of New York, have invented certain new and useful Improvements in Cage Structures, of which the following is a specification.

It is well known that cages, such as the bird cages to which this invention is preferably applied, are usually made of a series of parallel rods or bars, generally arranged in upright position. Said bars, being usually long, must, therefore, be provided with means wherewith to brace said bars intermediate of the ends thereof to prevent the occupant of the cage from forcing its way out between a pair of bars.

The means usually employed for bracing purposes comprises a cross-piece disposed generally at right angles to said bars and secured thereto against displacement longitudinally of said bars. The various types of means for securing the bars and brace together include holes in the brace through which a bar may be passed, a crimp in the bar or brace, or an independent member tying the parts together.

Figure 1:
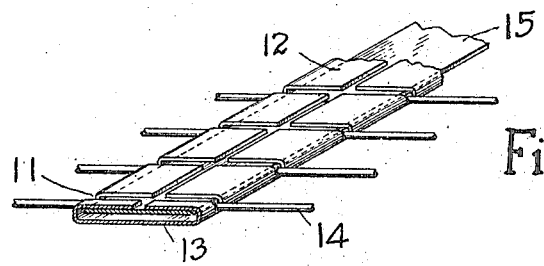
Figure 2:
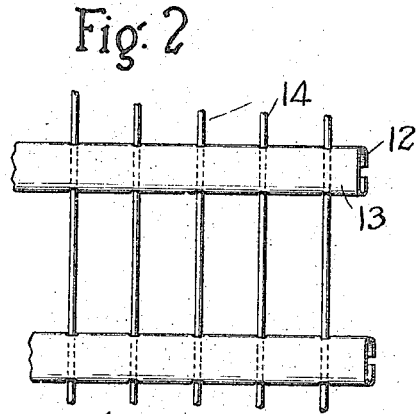
Figure 6:
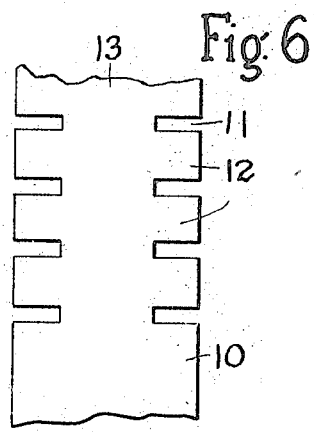
Figures 3, 4:
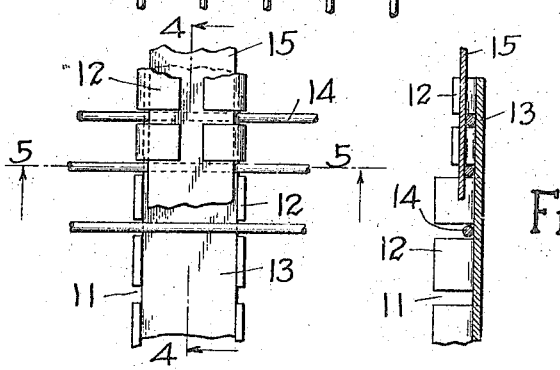
Figure 5:
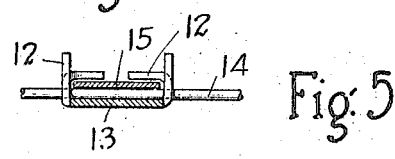

This invention contemplates the elimination of the necessity for separate handling of individual bars, or for distorting the bars or braces, or for making holes in the brace, and involves the clamping of the bars, which are preferably of circular cross-sectional shape, between an outer and an inner sheet. The invention will best be understood from the description which follows and from the drawings in which, Fig. 1 is a rear perspective view of my improved structure, Fig. 2 is a front elevation of the same, Fig. 3 is a top plan view of Fig. 1, Fig. 4 is a vertical section on the line 4—4 of Fig. 3, Fig. 5 is a horizontal section on the line 5—5 of Fig. 3, and Fig. 6 is an elevation of the blank from which the outer sheet of my improved structure is formed.

In the practical embodiment of my invention, I provide an outer flat bracing sheet 10 in which oppositely disposed preferably rectangular slots 11 are made to form a series of oppositely disposed tongues 12. In carrying out my invention, the tongues 12 are first bent up substantially at right angles to the remaining outer portion 13 as is indicated in Figs. 3, 4 and 5, after which the bars 14 are passed through the slots 11 into the resulting channel and preferably into contact with the inner surface of the outer portion 13. A flat inner sheet 15 preferably of slightly less width and thickness than that of said outer portion 13 is then placed upon the rods 14, and into the channel formed by the upright tongues 12.

The final step in assembling my improved structure is to turn over the tongues 12 into firm engagement with the inner sheet 15, whereby the parts are held firmly together against relative displacement, and the inner sheet 15 is hidden from view from the outside of the structure.

It will be understood that my improved structure is well adapted for the rapid assembling and bracing of a series of bars at a time, as by means of suitable tools or automatic machinery. I do not wish to be understood as limiting this invention to the exact details or to shape or proportions of the parts as herein illustrated and described, as it will be clear that changes therein may be made without departing from the spirit of the invention.

I claim:

1. In a cage structure, a series of straight substantially cylindrical parallel bars, and means for securing said bars in spaced relation including an outer strip comprising a substantially flat outer portion and substantially rectangular tongues integral with and bent parallel to said outer portion, said bars being disposed between said tongues so that an element of each of said bars is in contact with the inner surface of said outer portion, and a flat inner strip of less width than said outer strip maintained by said tongues in contact with each of said bars along an element of said bars substantially diametrically opposite said first mentioned element.

2. In a cage structure, an outer strip comprising a flat outer portion, spaced flat tongues integral with and bent parallel to said outer portion, a series of bars of substantially circular cross-section disposed in the spaces between said tongues and in contact with the inner flat face of said outer portion, and a flat inner strip contacting only with substantially a single element of each of said bars disposed between said tongues and said bars, held in place by the pressure of said tongues, and frictionally holding said bars in place.

3. In a cage structure, a continuous outer strip having a flat outer portion, edges thereon doubled over in spaced relation to said outer portion and having spaced rectangular slots in said doubled-over edges whereby a series of tongues are formed in said edges, a cylindrical bar in each of the oppositely disposed pairs of said slots, and a flat continuous inner strip parallel throughout to the outer portion of said outer strip, spaced from said outer strip a distance equal to the diameter of said bars, frictionally maintained in place by said tongues, and transmitting the pressure of said tongues substantially to a single element of each of said bars.

BERNARD MARKOW.